United States Patent
Cudak et al.

(10) Patent No.: US 9,959,133 B2
(45) Date of Patent: May 1, 2018

(54) IDENTIFICATION AND REMOVAL OF ZOMBIE VIRTUAL MACHINES

(71) Applicant: Lenovo Enterprise Solutions (Singapore) Pte. Ltd., Singapore (SG)

(72) Inventors: Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US); John S. Crowe, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 14/951,031

(22) Filed: Nov. 24, 2015

(65) Prior Publication Data

US 2017/0147372 A1 May 25, 2017

(51) Int. Cl.
*G06F 9/455* (2018.01)
*G06F 9/445* (2018.01)

(52) U.S. Cl.
CPC ...... *G06F 9/45558* (2013.01); *G06F 9/44505* (2013.01); *G06F 2009/45562* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 2011/0055830 A1* | 3/2011 | Kamay | ............... | G06F 1/3228 718/1 |
| 2011/0196968 A1* | 8/2011 | Kobayashi | ............ | G06F 9/5077 709/226 |
| 2015/0355923 A1* | 12/2015 | Keller | ................ | G06F 9/45558 718/1 |
| 2017/0109211 A1* | 4/2017 | Feng | .................... | G06F 9/5055 |

OTHER PUBLICATIONS

Nick Martin, "Strategies for Combating Zombie VMs" SearchServerVirtualization, searchservervirtualization.techtarget.com, Oct. 2014, pp. 1-5.
Joab Jackson, "Dell Foglight Vanquishes Zombie VMs" PCWorld.com, www.pcworld.com/article2047020/dell-foglight-vanquishes- . . . , Aug 20, 2013, pp. 1-4.
Veeam Blog, "5 Hints to Control VM sprawl with Veeam Availability Suite" Veeam.com, Sep. 15, 2014, pp. 1-9.

* cited by examiner

*Primary Examiner* — Eric C Wai
(74) *Attorney, Agent, or Firm* — Jeffrey L. Streets

(57) ABSTRACT

A method and a computer program product for causing a processor to perform the method are provided. The method includes creating a virtual machine having a virtual machine identifier, and storing an entry in a temporary virtual machine registry, wherein the entry includes the virtual machine identifier, inactivity criteria for the virtual machine, and a responsive action for the virtual machine. The method further includes monitoring the activity of the virtual machine, and initiating the responsive action associated with the virtual machine in response to the virtual machine satisfying the inactivity criteria.

16 Claims, 4 Drawing Sheets

Temporary Virtual Machine Registry
(Settings) — 151

| VMID | Inactivity Criteria | Responsive Action |
|---|---|---|
| VM00112 | No activity port 2 for 10 days | Shut down VM |
| VM00253 | No logins for 3 months | Email notice to Admin@XYZ.com |
| | | |
| | | |

— # IDENTIFICATION AND REMOVAL OF ZOMBIE VIRTUAL MACHINES

BACKGROUND

Field of the Invention

The present invention relates to the management of virtual machines. More specifically, the present invention relates to management of the system resources in a virtual machine environment.

Background of the Related Art

In a cloud computing environment, a user is assigned a virtual machine somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud. Because each virtual machine runs independent of other virtual machines, multiple operating system environments can co-exist on the same computer in complete isolation from each other.

Today, there are more virtual machines being deployed than physical servers. The process of deploying a new virtual machine is now so simple that a system administrator may create them for a wide variety of temporary purposes, such as testing, debugging, and temporary development environments. Many of these short-time-use, long-time-deployed virtual machines are not shut down at the end of their use and live on as zombie virtual machines.

There are software tools available that a system administrator can run in order to determine which virtual machines that are behaving similar to a zombie virtual machine. However, the system administrator must then carefully review the resulting list of virtual machines and determine which virtual machines are actually zombie virtual machines that should be shut down. Unfortunately, careful consideration may require a large time commitment and the resulting decisions may not be entirely accurate.

BRIEF SUMMARY

One embodiment of the present invention provides a method comprising creating a virtual machine having a virtual machine identifier, and storing an entry in a temporary virtual machine registry, wherein the entry includes the virtual machine identifier, inactivity criteria for the virtual machine, and a responsive action for the virtual machine. The method further comprises monitoring the activity of the virtual machine, and initiating the responsive action associated with the virtual machine in response to the virtual machine satisfying the inactivity criteria.

Another embodiment of the present invention provides a computer program product for managing virtual machines, the computer program product comprising a non-transitory computer readable storage medium having program instructions embodied thereon, wherein the program instructions are executable by a processor to cause the processor to perform a method. The method comprises creating a virtual machine having a virtual machine identifier, and storing an entry in a temporary virtual machine registry, wherein the entry includes the virtual machine identifier, inactivity criteria for the virtual machine, and a responsive action for the virtual machine. The method further comprises monitoring the activity of the virtual machine, and initiating the responsive action associated with the virtual machine in response to the virtual machine satisfying the inactivity criteria.

DETAILED DESCRIPTION

Figure 1:
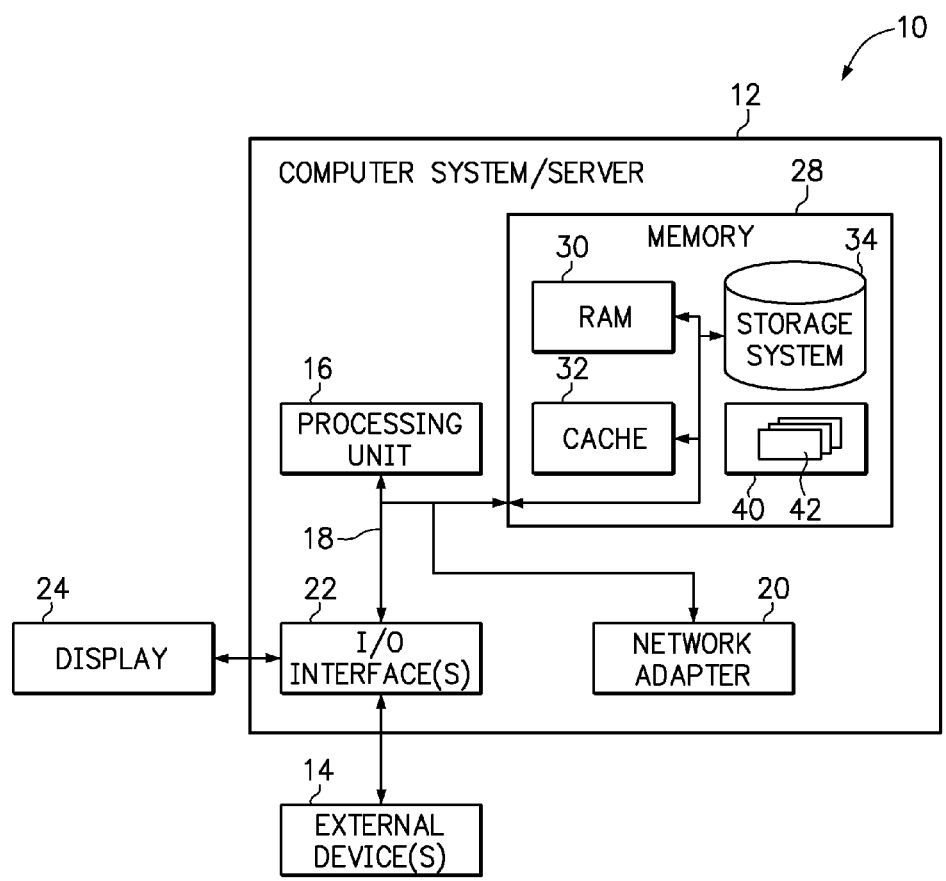
FIG. 1 is a diagram of an exemplary computer that may be utilized by the presently disclosed method, system, and/or computer program product.

One embodiment of the present invention provides a method comprising creating a virtual machine having a virtual machine identifier, and storing an entry in a temporary virtual machine registry, wherein the entry includes the virtual machine identifier, inactivity criteria for the virtual machine, and a responsive action for the virtual machine. The method further comprises monitoring the activity of the virtual machine, and initiating the responsive action associated with the virtual machine in response to the virtual machine satisfying the inactivity criteria.

In one option, the inactivity criteria may be expressed as a maximum amount of activity in a predetermined period of time. For example, the inactivity criteria may be no activity on a particular port in a given number of days. Alternatively, the inactivity criteria may be the absence of a login within a given number of months. Other variations and combinations of conditions may be used as the inactivity criteria. Any measure of activity that can be monitored may be used as an inactivity criteria.

In another option, the responsive action associated with the virtual machine may include automatically shutting down the virtual machine. After all, if the virtual machine has become a zombie in the sense that it is consuming resources but not performing any useful work, then automatically shutting down the virtual machine may be the best outcome. However, some administrators may prefer to analyze the activity or inactivity of the virtual machine before taking action. Accordingly, the responsive action associated with the virtual machine may include notifying a user that the virtual machine has satisfied the inactivity criteria. Such a user notification may include, without limitation, an action selected from sending an email message, outputting a message on a display screen, and generating a periodic report. In a further option, the method may initiate a timeout period starting upon notifying the user, and automatically shutting down the virtual machine at the expiration of the timeout period unless the user changes the responsive criteria in the temporary virtual machine registry. As used herein, the term "responsive", in reference to an action, means that the action is directed toward determining how to handle the virtual machine.

In a further embodiment, the method may further comprise prompting a user to input the inactivity criteria and the responsive action into the registry in response to creation of the virtual machine. This allows these end-of-life decisions for the virtual machine to be made by the individual user that caused the virtual machine to be created and during a period of time when the function and purpose of the virtual machine are on the user's mind. Optionally, a hypervisor may initially prompt the user to indicate whether the virtual machine is "temporary" and then, in response to a positive indication, prompt the user to input the inactivity criteria and the responsive action.

However, while the entry in the registry may be input and stored at a time that the virtual machine is created, the registry may be available for editing and receiving additional entries at any time during the life of a virtual machine. For example, a user may decide to make a second entry as to a particular virtual machine, such that any particular temporary virtual machine may have multiple inactivity criteria that each lead to a responsive action. In a specific situation, a first inactivity criteria for a virtual machine may lead to a notification and a second inactivity criteria for the same virtual machine may lead to a shutdown. In another example, a given virtual machine may already have an entry in the temporary virtual machine registry, but the user may review the registry and make changes to individual entries, either changing the inactivity criteria or the responsive action. Such changes may be implemented as a result of system policy changes or an increasing strain on system resources. In a still further example, an entry may be made for an existing virtual machine that was not previously recognized as being temporary, such that the virtual machine will subsequently be subject to a responsive action if the virtual machine satisfies the inactivity criteria.

Another embodiment of the present invention provides a computer program product for managing virtual machines, the computer program product comprising a non-transitory computer readable storage medium having program instructions embodied thereon, wherein the program instructions are executable by a processor to cause the processor to perform a method. The method comprises creating a virtual machine having a virtual machine identifier, and storing an entry in a temporary virtual machine registry, wherein the entry includes the virtual machine identifier, inactivity criteria for the virtual machine, and a responsive action for the virtual machine. The method further comprises monitoring the activity of the virtual machine, and initiating the responsive action associated with the virtual machine in response to the virtual machine satisfying the inactivity criteria.

The foregoing computer program products may further include program instructions for implementing or initiating any one or more aspects of the methods described herein. Accordingly, a separate description of the methods will not be duplicated in the context of a computer program product.

FIG. 1 is a diagram of a first example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
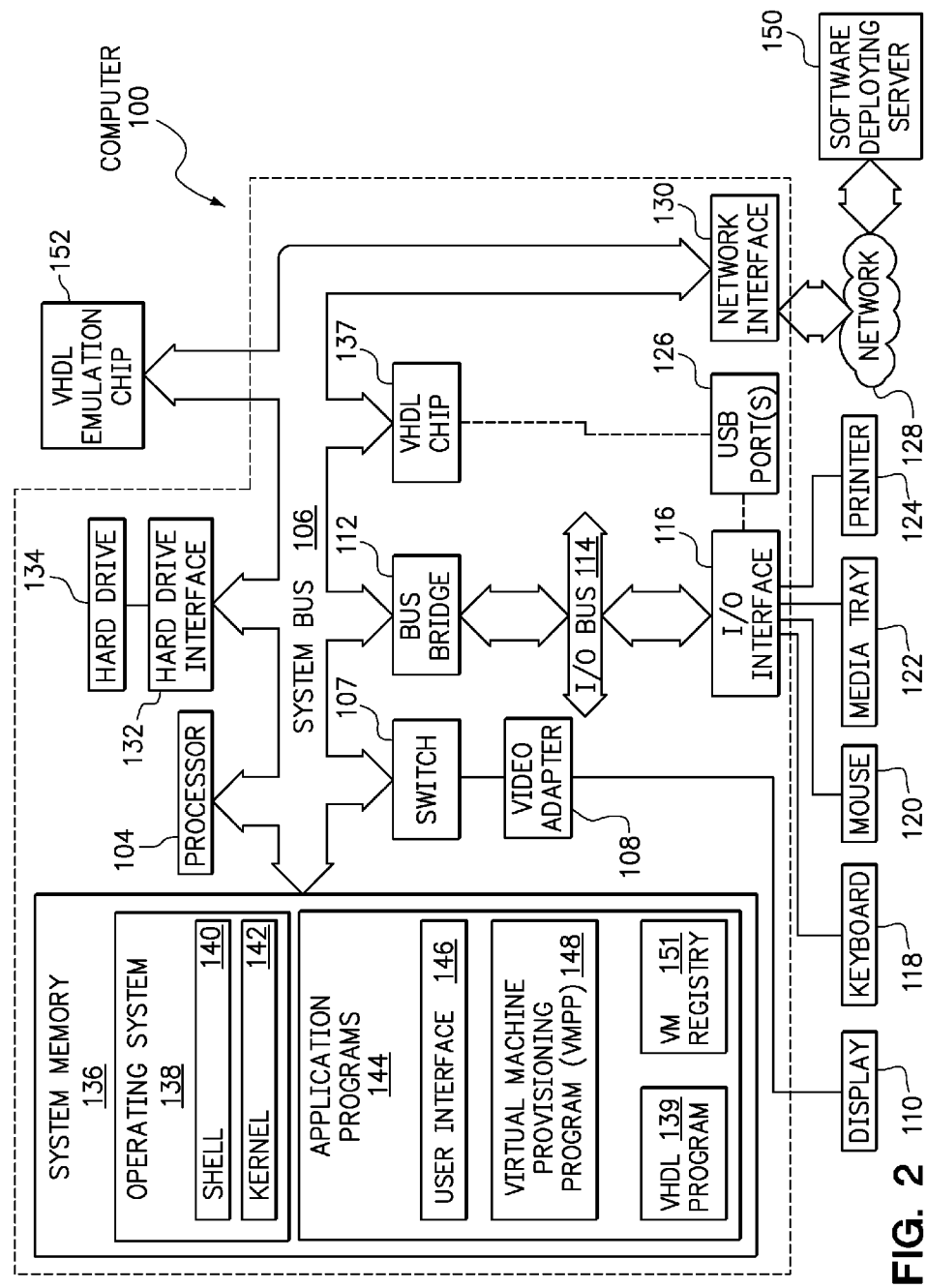
FIG. 2 is a diagram of an alternative computer that may be utilized by the presently disclosed method, system, and/or computer program product.

FIG. 2 is a diagram of an alternative computing node (or simply "computer") 100 that may be utilized in accordance with one or more embodiments of the present invention. Note that some or all of the exemplary architecture, including both depicted hardware and software, shown for and within computer 100 may be utilized by the software deploying server 150, as well as the provisioning manager/management node 222 and the server blades 204a-n shown in FIG. 3. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 100 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program-VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 100 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes computer 100's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 100) to send and receive network messages to the Internet using hypertext transfer protocol (HTTP) messaging, thus enabling communication with software deploying server 150 and other described computer systems.

Application programs 144 in the system memory of computer 100 (as well as the system memory of the software deploying server 150) may include a user interface 146 for inputting data into a virtual machine registry 151, and a virtual machine provisioning program (VMPP) 148. VMPP 148 includes code for implementing the processes of the present invention. VMPP 148 is able to communicate with virtual machine registry 151, which accepts and stores inactivity criteria and responsive actions for each "temporary" virtual machine. In one embodiment, the computer 100 is able to download VMPP 148 from software deploying server 150, including in an on-demand basis.

Also stored in the system memory 136 is an optional VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 152. VHDL emulation chip 152 may incorporate a similar architecture as described above for VHDL chip 137. Once VMPP 148 and VHDL program 139 program the VHDL emulation chip 152, the VHDL emulation chip 152 performs, as hardware, some or all functions described by one or more executions of some or all of the instructions found in VMPP 148. That is, the VHDL emulation chip 152 is a hardware emulation of some or all of the software instructions found in VMPP 148. In one embodiment, the VHDL emulation chip 152 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 100 are not intended to be exhaustive, but rather are representative to highlight essential components required by the present invention. For instance, computer 100 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned a virtual machine (VM) somewhere in the computing cloud. This virtual machine provides the software operating system and physical resources such as processing power and memory to support the user's application workload.

Figure 3:
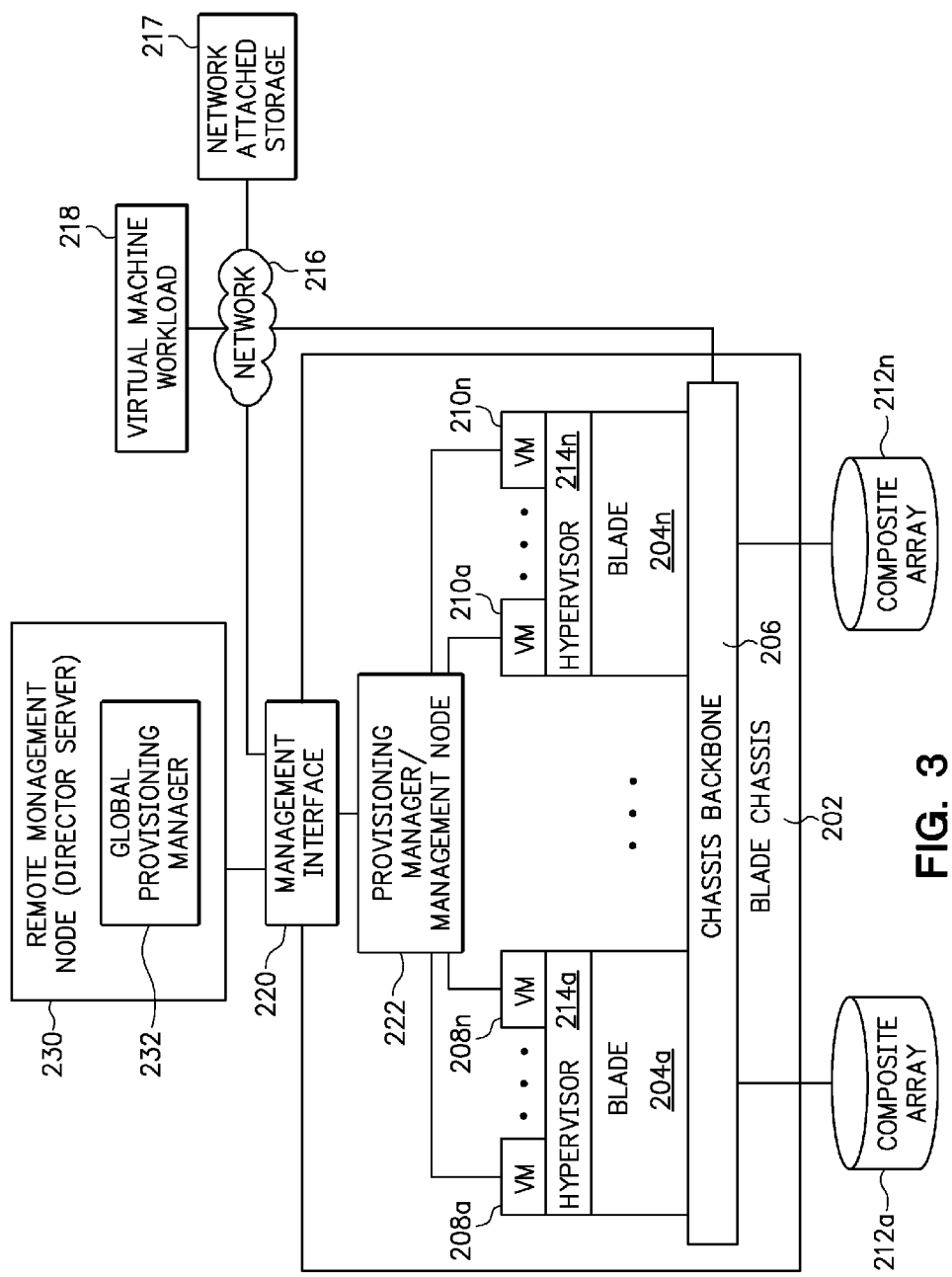
FIG. 3 is a block diagram of virtual machines running on two compute nodes.

FIG. 3 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204a-n (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As shown, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. The virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figures 4, 5:
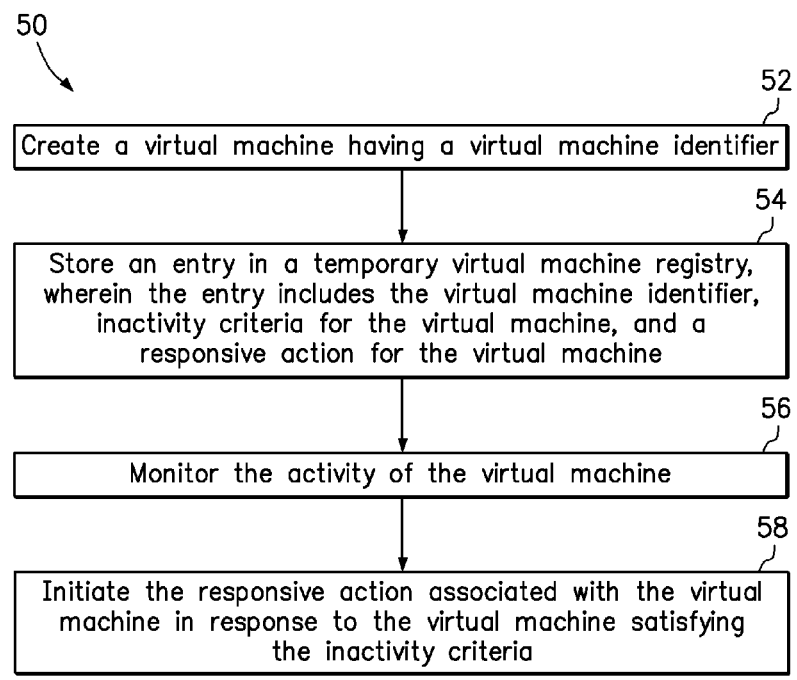
FIG. 4 is an illustration of a temporary virtual machine registry in the form of a table.
FIG. 5 is a flowchart of a method according to one embodiment of the present invention.

FIG. 4 is an illustration of a temporary virtual machine registry 151 in the form of a table. The registry 151 is illustrated having a first column for virtual machine identifiers, a second column for inactivity criteria, and a third column for responsive actions. Below the column headers, the registry includes examples of two entries, where each entry includes multiple fields on the same row. A first entry includes a virtual machine identifier ('VM00112"), an inactivity criteria ("No activity [on] port 2 for 10 days"), and a responsive action ("Shut down VM") that are associated with a first temporary virtual machine. A second entry includes a virtual machine identifier ('VM00253"), an inactivity criteria ("No logins for 3 months"), and a responsive action ("Email notice to Admin@XYZ.com") that are associated with a second temporary virtual machine. The method would then include monitoring for VM00112 activity on port 2 and monitoring for logins to VM00253. If VM00112 has no activity on port 2 for 10 days, then VM00112 is automatically shut down. If VM00253 has no logins for 3 months, then an email notice of this fact is sent to Admin@XYZ.com.

FIG. 5 is a flowchart of a method 50 according to one embodiment of the present invention. In step 52, the method creates a virtual machine having a virtual machine identifier. In step 54, the method stores an entry in a temporary virtual machine registry, wherein the entry includes the virtual machine identifier, inactivity criteria for the virtual machine, and a responsive action for the virtual machine. In step 56, the method monitors the activity of the virtual machine. Then, in step 58, the method initiates the responsive action associated with the virtual machine in response to the virtual machine satisfying the inactivity criteria.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied thereon, the program instructions executable by a processor to:
   create a virtual machine having a virtual machine identifier;
   store an entry in a temporary virtual machine registry, wherein the entry includes the virtual machine identifier, inactivity criteria for the virtual machine, and a responsive action for the virtual machine, wherein the inactivity criteria is an amount of activity over a period of time;
   monitor the activity of the virtual machine; and
   initiate the responsive action associated with the virtual machine in response to the virtual machine satisfying the inactivity criteria.

2. The computer program product of claim 1, the program instructions further executable by a processor to:
   prompt a user to input the inactivity criteria and the responsive action in response to creation of the virtual machine.

3. The computer program product of claim 1, wherein the responsive action associated with the virtual machine includes automatically shutting down the virtual machine.

4. The computer program product of claim 1, wherein the responsive action associated with the virtual machine includes notifying a user that the virtual machine has satisfied the inactivity criteria.

5. The computer program product of claim 4, wherein notifying a user includes an action selected from sending an email message, outputting a message on a display screen, and generating a periodic report.

6. The computer program product of claim 4, the program instructions further executable by a processor to:
   initiate a timeout period starting upon notifying the user; and
   automatically shut down the virtual machine at the expiration of the timeout period unless the user changes the responsive criteria in the temporary virtual machine registry.

7. The computer program product of claim 1, wherein the entry in the temporary virtual machine registry is stored at a time that the virtual machine is created.

8. A method comprising:
   creating a virtual machine having a virtual machine identifier;
   storing an entry in a temporary virtual machine registry, wherein the entry includes the virtual machine identifier, inactivity criteria for the virtual machine, and a responsive action for the virtual machine, wherein the inactivity criteria is an amount of activity over a period of time;
   monitoring the activity of the virtual machine; and
   initiating the responsive action associated with the virtual machine in response to the virtual machine satisfying the inactivity criteria.

9. The method of claim 8, the method further comprising:
   prompting a user to input the inactivity criteria and the responsive action in response to creation of the virtual machine.

10. The method of claim 8, wherein the responsive action associated with the virtual machine includes automatically shutting down the virtual machine.

11. The method of claim 8, wherein the responsive action associated with the virtual machine includes notifying a user that the virtual machine has satisfied the inactivity criteria.

12. The method of claim 11, wherein notifying a user includes an action selected from sending an email message, outputting a message on a display screen, and generating a periodic report.

13. The method of claim 11, further comprising:
   initiating a timeout period starting upon notifying the user; and
   automatically shutting down the virtual machine at the expiration of the timeout period unless the user changes the responsive criteria in the temporary virtual machine registry.

14. The method of claim 8, wherein the entry in the temporary virtual machine registry is stored at a time that the virtual machine is created.

15. A computer program product comprising a non-transitory computer readable storage medium having program instructions embodied thereon, the program instructions executable by a processor to:
   create a plurality of virtual machines, wherein each of the virtual machines has a unique virtual machine identifier;
   store, for each of the virtual machines, an associated entry in a temporary virtual machine registry, wherein the entry associated with each virtual machine includes the virtual machine identifier of the virtual machine, inactivity criteria for the virtual machine, and a responsive action associated with the inactivity criteria for the virtual machine, wherein the inactivity criteria is an amount of activity over a period of time;
   monitor the activity of each of the virtual machines; and
   initiate the responsive action associated with the inactivity criteria of any particular one of the virtual machines in response to the particular virtual machine satisfying the inactivity criteria.

16. The computer program product of claim 15, the program instructions further executable by a processor to:
   store, for the entry associated with a given one of the virtual machines, second inactivity criteria for the given virtual machine and a second responsive action associated with the second inactivity criteria for the given virtual machine; and
   initiate the second responsive action associated with the second inactivity criteria in response to the given virtual machine satisfying the second inactivity criteria.

* * * * *